United States Patent [19]
Castiglioni

[11] 3,741,367
[45] June 26, 1973

[54] LOADING DEVICE PARTICULARLY FOR FEEDING SCREW BLANKS AND THE LIKE TO A PROCESSING MACHINE

[75] Inventor: Albino Castiglioni, Cornaredo, Italy

[73] Assignee: SIMA Societa Italiana Macchine Automatiche S.r.L., Cornareo (Prov. Milano) Italy

[22] Filed: June 1, 1971

[21] Appl. No.: 148,591

[30] Foreign Application Priority Data
Sept. 5, 1970 Italy.............................. 29416 A/70

[52] U.S. Cl............................. 198/33 AA, 198/165
[51] Int. Cl......................... B65g 15/14, B65g 47/24
[58] Field of Search................ 198/33 AA, 173, 76, 198/165; 221/160, 165

[56] References Cited
UNITED STATES PATENTS
2,911,088  11/1959  Ingham ......................... 198/33 AA
1,550,803  8/1925  Harbison......................... 221/165 X FOREIGN PATENTS OR APPLICATIONS
2,870  12/1858  Great Britain...................... 221/165

Primary Examiner—Edward A. Sroka
Attorney—Fuido Modiano and Albert Josif

[57] ABSTRACT

A loading device particularly for feeding screw blanks and the like rough-shaped pieces to a processing machine comprising a hopper, a base, an upright supported on said base defining part of a wall of said hopper, a slot defining a path comprising a substantially horizontal section on the bottom of said hopper and an ascending section in said upright, an endless driven chain with spaced pushing means movable below said slot, and auxiliary means provided at the upper extremity of said path for advancing said blanks at a greater linear translation velocity than that of said chain.

4 Claims, 7 Drawing Figures

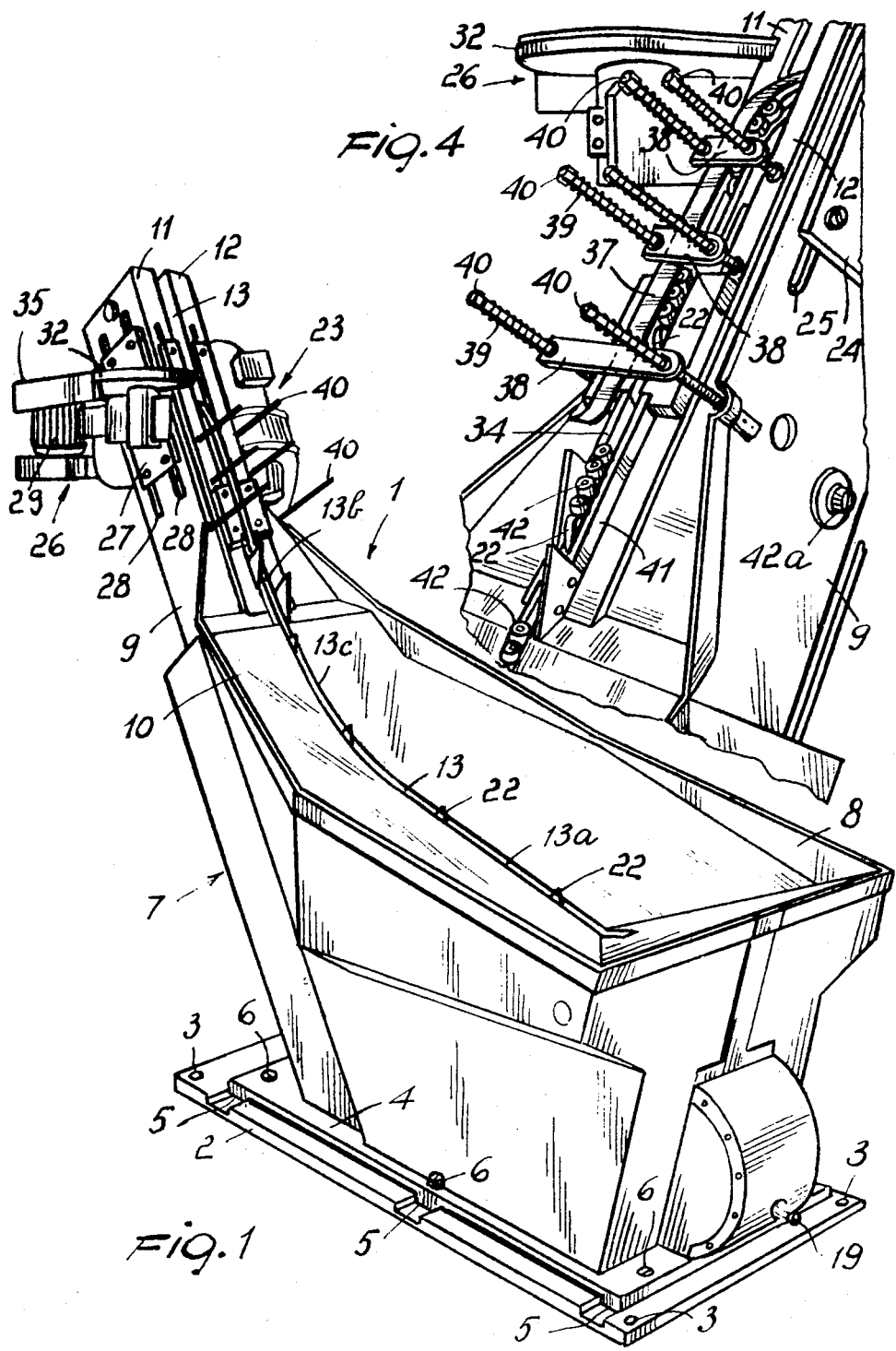

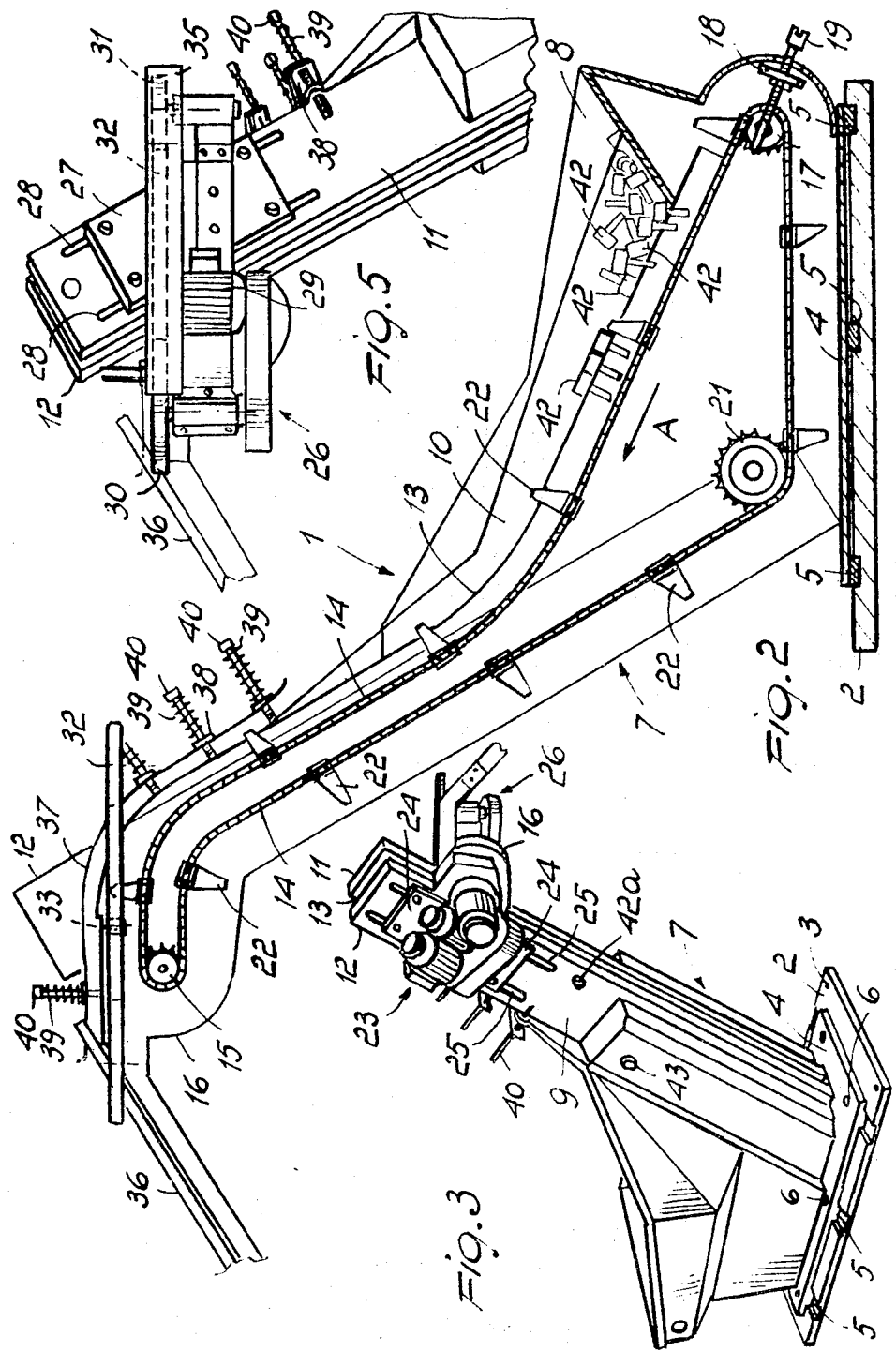

3,741,367

LOADING DEVICE PARTICULARLY FOR FEEDING SCREW BLANKS AND THE LIKE TO A PROCESSING MACHINE

BACKGROUND OF THE INVENTION

This invention relates to a loading device or loader particularly suitable for feeding screw blanks, bolt blanks, and the like rough-shaped pieces to a processing machine.

In the field of screw manufacture the need has long been felt for an automatic loader for feeding screw blanks to a processing machine, because existing machines, although giving satisfactory results from some points of view, are often subject to jamming which causes prolonged shutdowns while putting the loader back into operation, and require frequent intervention by a machine operator and thus prolong the manufacturing time per screw. In the case of conventional loading devices, a path is provided defined by a slot in which a plurality of spaced toothed members or pushers travel, and which entrain the screw blanks arranged with their shank inserted in the slot and their head in sliding contact with its lateral edges. The screw blanks are firstly placed in bulk in a tray or hopper with their base inclined towards the slot. Due to gravity and the action of the pushers or teeth moved by a chain along the slot, each screw blank becomes arranged in the foregoing manner in said slot. This latter is of such a width as to receive the shank of the blank but not to let its head pass.

The path defined by the slot comprises a first substantially horizontal section in a position corresponding with the tray or hopper, and a second ascending section which terminates upperly at a guide or chute which in its turn introduces the screws or screw blanks into a processing machine. Very often in the zone of passage between the substantially horizontal section and the ascending section the screws heap up or foul each other causing jamming and compelling the machine operator to stop the entraining chain in order to unblock the various pieces. Further at the upper extremity of the ascending section of the path where the blanks are transferred to the chute for introduction to the processing machine, each tooth of the chain undergoes acceleration relative to the entrained blanks, because it has to turn about the driving wheel of the chain. This causes the screw to receive a blow on its shank, because the tooth which begins to turn about the driving wheel of the chain falls with respect to the screw and increases its peripheral velocity to such a level that the screw blanks are often hit and thrown outside the slot.

SUMMARY OF THE INVENTION

The main object of this invention is that of substantially eliminating the foregoing disadvantages by providing a loading device for screw blanks of the foregoing type, which is of reliable operation, allows elevated hourly production rates to be obtained and is not subject to frequent jamming. A further object of this invention is that said device is easily adaptable both to a vast range of types and sizes of screw blanks or the like and to various types of processing machines to be fed.

A further object of the present invention is that said device is of simple design and manufacture, occupies minimum space and is of low cost.

A further object of the present invention is that said device has a rational layout of parts, can be rapidly installed and does not require the continuous supervision of an operator. These and further objects which will better appear hereinafter are attained by a loading device particularly for feeding screw blanks and the like to a processing machine, comprising a base, a tray or hopper on said base, an upright supported rigidly on said base and defining at least part of a wall of said tray, a slot which defines a path comprising a first substantially horizontal section provided on the bottom of said tray, and a second ascending section formed in said upright, an endless chain movably mounted below said slot, pushing mans fixed and spaced on said chain and arranged in such a manner as to be able to travel in said slot and driving means for said chain, wherein said first substantially horizontal path section and said second ascending section are connected through a wide radius of curvature and wherein auxiliary means of advancement for said blanks are provided at the upper extremity of said path, and driven at a linear translation velocity substantially greater than that of said chain.

BRIEF DESCRIPTION OF THE DRAWINGS

Further characteristics and advantages of the invention will more clearly appear from the detailed description given hereinafter of a preferred but not limiting embodiment of the invention given by way of example with reference to the accompanying drawings, in which:

FIG. 1 is a perspective view, partially from behind, of a loading device according to the invention;

FIG. 2 is a diagrammatic sectional view on the longitudinal axial plane of the device shown in FIG. 1;

FIG. 3 is a partially frontal perspective view of the loading device shown in FIG. 1;

FIG. 4 is a detail of the ascending section of the feed path of the screw blanks;

FIG. 5 is the upper part of the upright provided with auxiliary means of advancement for the blanks;

DESCRIPTION OF PREFERRED EMBODIMENT

Figure 6:
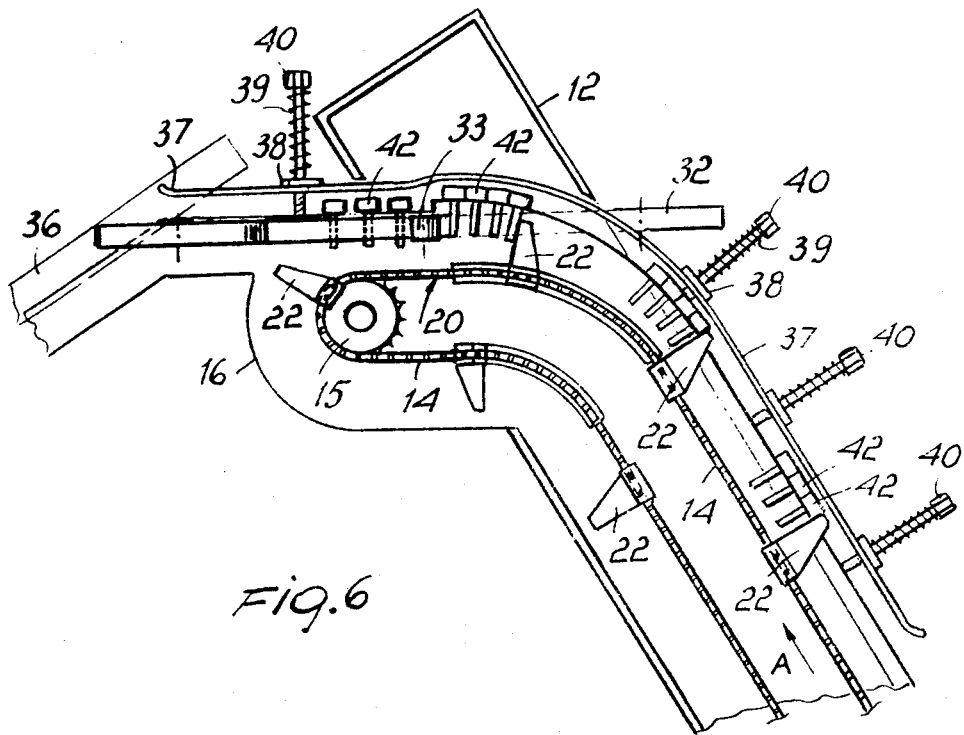
FIG. 6 is a sectional diagrammatic longitudinal axial view of FIG. 5.

In the preceding figures the loading device or loader according to the invention is generally indicated at 1.

The loader 1 comprises a base 2 substantially consisting of a supporting and/or floor fixing plate. For this purpose the plate 2 comprises holes 3 for receiving anchoring bolts or the like.

A saddle 4 is mounted on the plate 2 and can be moved transversally with respect to the plate 2 along guides 5 and be adjustably fixed in position by means of bolts 6.

On the saddle 4 a frame 7 is mounted comprising essentially a tray or hopper 8 and an upright 9 mounted rigid with respect to the tray 8. This latter comprises a base and walls converging in the longitudinal direction towards its own center line, while its wall 10 is brought behind the upright 9 to the level of the upright 9, its extension or prolongation being formed by the upright itself.

The upright 9 is inclined with respect to the vertical in the direction away from the tray 8 and its center line is in the same vertical plane as the center line of the tray. More particularly the upright 9 comprises two box-like longitudinal members 11 and 12 which define a slot 13 between them which is prolonged on the bottom of the tray 8. The slot 13 thus defines a path which comprises a first substantially horizontal section 13a at the bottom of the tray 8 and a second ascending section 13b defined in the upright 9, which are connected through a wide radius of curvature for reasons which will appear hereinafter.

Below the slot 13 an endless chain 14 travels which is wound on a chain driving wheel 15 situated on a positionable bracket 16 arranged in the upper part of the upright 9 and on an idle gear wheel 17 situated below the tray 8. The gear wheel 17 is mounted on a chain tightening device generically indicated with the reference numeral 18 and operated by way of the control 19.

At the driving wheel 15 the chain 14 follows a substantially horizontal path as shown in FIG. 6 by the reference numeral 20, for reasons which will be explained hereinafter. Below the tray 8 the chain winds on an idly mounted gearwheel 21. On the chain 14 a plurality of pawls or pushers 22 is mounted which are spaced one from the other and slightly project above the slot 13 when they move along it.

Figure 7:
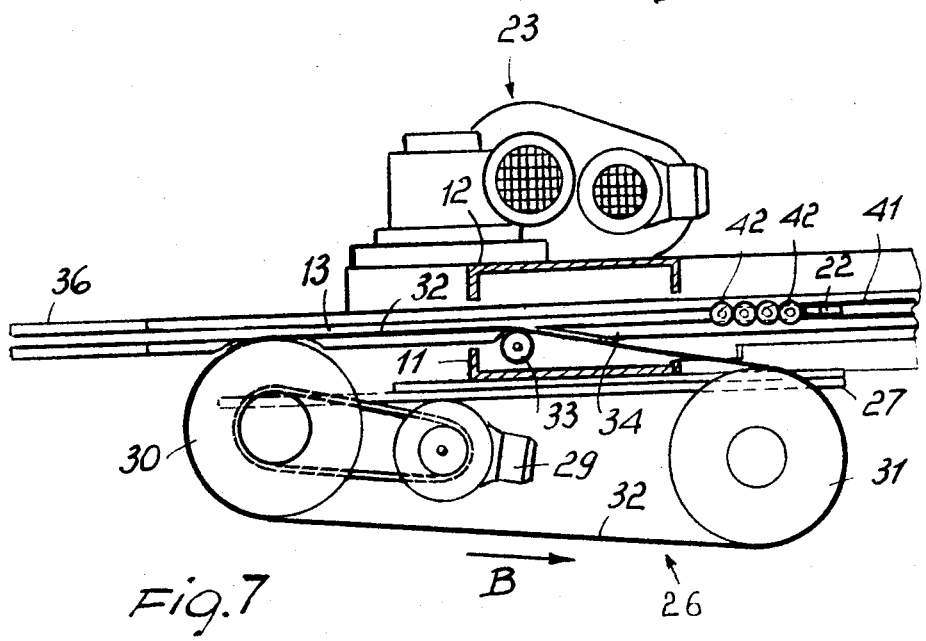
FIG. 7 is a diagrammatic view from above of FIG. 5.

The driving wheel 15 is driven by a motorized reduction unit generically indicated by the reference numeral 23 (FIG. 3) mounted on a plate 24 bolted in the slots 25 so that it can be positioned adjustably along the longitudinal member 12 of the upright 9. The bracket 16 is rigid with the motorized reduction unit 23 because of which it is adjustably positionable with it. On the opposite side of the longitudinal member 11 with respect to the motorized reduction unit 23, a unit 26 is provided mounted on a plate 27 adjustably fixed by way of slots 28 to the longitudinal member 11. The unit 26 comprises a motor 29, a pulley 30 driven by the motor 29, an idle pulley 31 and a steel band 32 which passes over the pulleys 31 and a steel band 32 which passes over the pulleys 30 and 31 and over a roller 33. This latter, is provided at the extremity of the slot 13 so that in conjunction with the pulley 30 it brings the band 32 parallel and coincident with one side piece 34 of the slot. The band 32 between the roller 33 and pulley 30 is at a lower level than the side piece 34 (FIG. 6), which terminates at the roller 33 in the manner illustrated for example in FIG. 7. The direction of movement of the bank 32 is indicated by the arrow B.

The unit 26 is partially covered by a protective cover 35 (FIG. 5) and is coupled in a removable manner to a guide or chute 36 which discharges onto a processing machine (not shown). Above the ascending section 13b of the slot 13 in the upright 9, a flexible plate 37 is provided which follows the direction of the slot until it reaches the back of the chute 36. More particularly the plate 37 is fixed to a plurality of tie bars 38 each supported by two helical springs 39 placed and anchored on two corresponding uprights 40, one of which is fixed to the longitudinal member 11 and the other to the longitudinal member 12. At the uprights 40 fixed to one of the longitudinal members, (that bearing the reference numeral 12 in the case illustrated) the tie bars are advantageously inserted in the uprights themselves, while at the other longitudinal member they comprise a notch for receiving the upright. This allows the mutual approach or withdrawal of the longitudinal members 11 and 12 within certain limits, in order to vary with width of the slot 13.

The slot 13 is bordered by two side pieces at the upright 9, one indicated by the reference numeral 34 and the other on the longitudinal member 12 indicated by the reference numeral 41. Because of the presence of jacking devices (not shown) the units 23 and 26 can be raised and lowered along the respective slots 25 and 28 by acting with a crank (not shown) on the hub (42a) provided on the longitudinal member 12 so as to be above to adapt the loader 1 to various types of processing machines.

The operation of the loader 1 according to the invention is as follows. By feeding electric current to the unit 23, comprising a motor and reduction gear unit, the chain 14 is made to move in the direction indicated by the arrow A in FIG. 2. Once the tray 8 has been loaded with screw blanks 42, they are made to fall by the action of gravity and the pushers 22, into the slot 13 shank first, whereas the head rests on the edges of the slot.

Each pusher 22 can thus push one or more blanks forward in the direction of the arrow A. Because of the large radius of curvature of the section 13c there is no risk of the blanks jamming against the slot 13. If one piece should partially foul another, it is compelled to take up its correct position on passing under the plate 37. The unit 26, is started simultaneously with the unit 23, and dries the band 32 at a linear velocity greater than that of the chain 14. Consequently, when the blank arrives at the roller 33, one end of it will still rest on the side piece 41 while the other will be lowered onto the band 32 and will be made to advance towards the chute 36 at a higher velocity. Even in the case in which a blank is in contact with a pusher 22, it will not undergo blows by this latter because it is obliged to withdraw from the pusher by the action of the band 32. On the other hand, when the pusher 22 begins to turn about the wheel 15, it is located at such a distance from the slot 13 as not to be able to interfere with the blanks conveyed by the band 32.

Finally enlargement of the slot 13 for adaptation to blanks of different thicknesses is made by acting on means (not shown) by way of a crank applied to the connection 43 (FIG. 3). Obviously by varying the height of the side pieces 3 and 41 the loader 1 can be adapted to suit blanks 42 of various lengths.

I claim:

1. A loading device particularly for feeding screw blanks and the like to a processing machine, comprising a tray or hopper for said screws and the like, an upright supported rigidly on said base and defining at least part of a wall of said tray, a slot which defines a path comprising a first substantially horizontal section provided on the bottom of said tray and a second ascending section formed in said upright, said first and second section being connected through a wide radius of curvature, an endless chain movably mounted below said slot and provided with pushing means spaced on said chain and arranged in such a manner as to be able to travel in said slot for advancing said screws and the like within said slot, driving means for said chain and means of advancement for said blanks at the upper extremity of said path, said means of advancement including a unit comprising two pulleys and a band wound on said pulleys, said band comprising a section substantially parallel and in continuation to one side of said slot, driving means being provided for moving said band at a linear translation velocity substantially greater than that of said chain.

2. A loading device as claimed in claim 1, wherein said band section substantially parallel to one side of said slot and arranged as a continuation of it is arranged in a substantially horizontal plane which also contains the upper extremity of the other side of said slot.

3. A loading device as claimed in claim 1, wherein said auxiliary means of advancement are mounted on a support unit including said upper extremity of said path, said support unit having means for being slideably displace along a portion of said uprights and secured in an adjustable position thereon.

4. A loading device as claimed in claim 1, which further comprises a sprung plate arranged above said slot to eliminate possible defects in alignment of the blanks pushed along said slot, said sprung plate extending continuously above said upper extremity of said path and said means of advancement.

* * * * *